US 8,112,433 B2

(12) United States Patent
Correa

(10) Patent No.: US 8,112,433 B2
(45) Date of Patent: Feb. 7, 2012

(54) METHOD, SYSTEM AND PROGRAM FOR ENABLING RESONANCE IN COMMUNICATIONS

(75) Inventor: Alcantaro J. Correa, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 1452 days.

(21) Appl. No.: 11/292,188

(22) Filed: Dec. 1, 2005

(65) Prior Publication Data
US 2006/0136486 A1 Jun. 22, 2006

(30) Foreign Application Priority Data
Dec. 16, 2004 (CA) ...................................... 2490685

(51) Int. Cl.
*G06F 17/30* (2006.01)
*G06Q 10/00* (2006.01)

(52) U.S. Cl. ........ 707/769; 707/702; 707/779; 707/805; 705/7.27; 705/7.12

(58) Field of Classification Search .................. 707/600, 707/602, 603, 609, 687, 688, 694, 758, 790, 707/821, 829, 702, 769, 779, 805; 709/203, 709/215–220; 705/1–10, 26–27, 11–12; 704/266, 269, 273, 276; 702/182–184, 187
See application file for complete search history.

(56) References Cited

U.S. PATENT DOCUMENTS

| | | | | |
|---|---|---|---|---|
| 5,118,105 A | * | 6/1992 | Brim et al. | 473/58 |
| 5,903,478 A | * | 5/1999 | Fintel et al. | 703/6 |
| 5,961,598 A | * | 10/1999 | Sime | 709/224 |
| 6,067,546 A | * | 5/2000 | Lund | 1/1 |
| 6,122,633 A | * | 9/2000 | Leymann et al. | 1/1 |
| 6,208,345 B1 | * | 3/2001 | Sheard et al. | 715/853 |
| 6,411,936 B1 | * | 6/2002 | Sanders | 705/10 |
| 6,591,244 B2 | * | 7/2003 | Jim et al. | 705/9 |
| 6,727,106 B1 | * | 4/2004 | Ankutse et al. | 438/5 |
| 6,954,758 B1 | * | 10/2005 | O'Flaherty | 707/802 |
| 6,970,844 B1 | * | 11/2005 | Bierenbaum | 705/39 |
| 2002/0065885 A1 | * | 5/2002 | Buonanno et al. | 709/205 |

(Continued)

FOREIGN PATENT DOCUMENTS
WO    WO 02/19272    *    3/2002

(Continued)

OTHER PUBLICATIONS

Tamara Almarabeh1, et al. "Value Chain Model in Knowledge Management", International Journal of Recent Trends in Engineering, vol. 2, No. 2, Nov. 2009.*

(Continued)

*Primary Examiner* — Srirama Channavajjala
(74) *Attorney, Agent, or Firm* — Andrea Bauer; Hoffman Warnick LLC

(57) ABSTRACT

A method, computer program product, and system for collecting and processing feedback information in organizational communications. The system includes an information processing apparatus, a communications mechanism, a database, and a mechanism for collecting data. The communications mechanism operates with the information processing apparatus for providing communications to a user of the information processing apparatus. The database operates in conjunction with the information processing apparatus and the communications mechanism. The database stores data. The mechanism for collecting the data operates in response to the communications related to the user by the communications mechanism.

11 Claims, 9 Drawing Sheets

U.S. PATENT DOCUMENTS

| | | | |
|---|---|---|---|
| 2002/0120494 A1* | 8/2002 | Altemuehle et al. ............. 705/11 |
| 2002/0169658 A1* | 11/2002 | Adler ............................... 705/10 |
| 2002/0174000 A1* | 11/2002 | Katz et al. ......................... 705/7 |
| 2003/0074342 A1* | 4/2003 | Curtis ............................... 707/1 |
| 2003/0193502 A1* | 10/2003 | Patel et al. ..................... 345/440 |
| 2004/0064456 A1* | 4/2004 | Fong et al. .................... 707/100 |
| 2004/0138944 A1* | 7/2004 | Whitacre et al. ................ 705/11 |
| 2004/0172272 A1* | 9/2004 | Shillinglaw et al. .............. 705/1 |
| 2004/0230438 A1* | 11/2004 | Pasquale et al. .................. 705/1 |
| 2005/0154557 A1* | 7/2005 | Ebert ............................ 702/182 |
| 2005/0192853 A1* | 9/2005 | Ebert et al. ........................ 705/7 |
| 2005/0223032 A1* | 10/2005 | Shan et al. ................ 707/104.1 |
| 2006/0005124 A1* | 1/2006 | Speicher ....................... 715/514 |
| 2006/0053087 A1* | 3/2006 | Pavlov ............................... 707/1 |
| 2009/0006441 A1* | 1/2009 | Tolskyakov et al. .......... 707/102 |

FOREIGN PATENT DOCUMENTS

| | | | |
|---|---|---|---|
| WO | WO 03/036547 | * | 5/2003 |
| WO | WO 2004/068295 | * | 8/2004 |

OTHER PUBLICATIONS

Chang-Sup Park et al. "Finding an efficient rewriting of OLAP queries using materialized views in data warehouses",Decision Support Systems 32 (2002) 379-399.*

Jyh-Jong Lin et al. An Object-Oriented Analysis Method for Customer Relationship Management Information Systems, Electronic Commerce Studies, vol. 2, No. 1, Spring 2004, p. 75-94.*

* cited by examiner

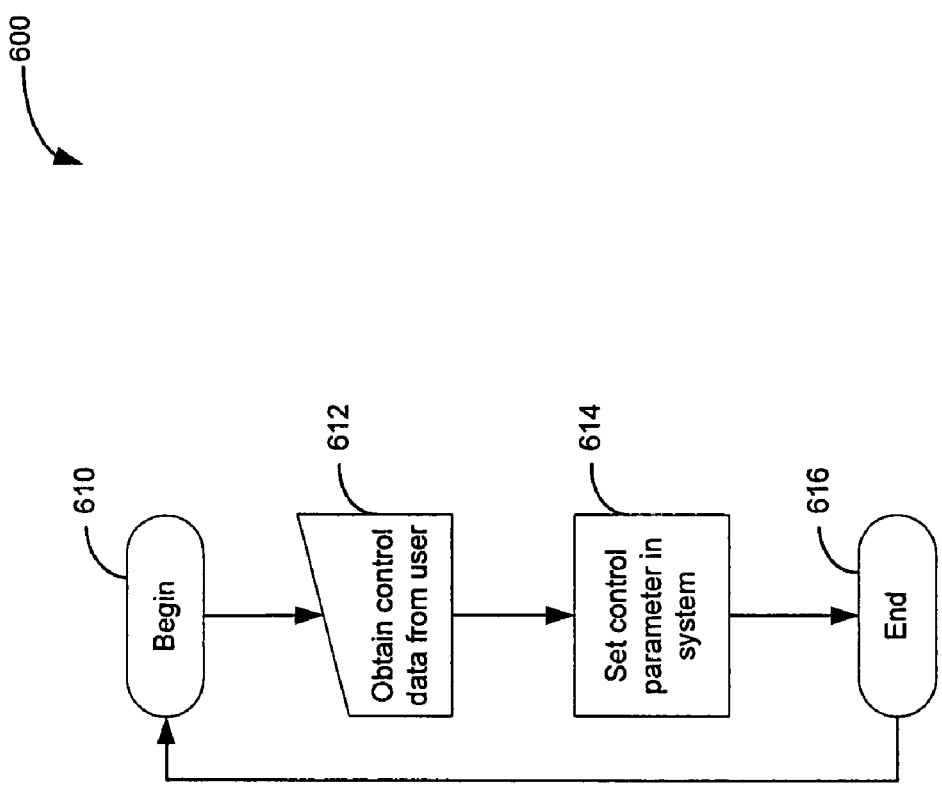

METHOD, SYSTEM AND PROGRAM FOR ENABLING RESONANCE IN COMMUNICATIONS

FIELD OF THE INVENTION

The present invention relates to database and information technology systems, and more particularly to a system and method for enabling resonance in communications.

BACKGROUND OF THE INVENTION

Databases are useful tools for storing, organizing, and accessing data and information. A database stores data in data containers including records having one or more data fields. DataBase Management Systems (DBMSs) are often used by database users to control the storage, organization, and retrieval of data (fields, records, and files) in a database.

Typically, organizations create value through models that are organized into processes, which involve people, automated systems and interactions. Due to the complexity and intricacy of the network that manages these processes, it is a significant challenge for organizations to achieve high levels of efficiency. Since databases typically play an integral role in the automated systems that facilitate the interactions which organizations employ, much room exists for improvement in database technology and implementation.

As organizational practices advanced in the information age, organizations began to depend on increased information flow across the organizational structure and through the value chain to create value. The creation of value is an inevitable consequence of the efficient flow of information across an organization. Increasingly, organizations rely on automated systems to support a complex web of organizational processes, including E-mail, workflow management, collaboration, data access and application systems. Information Technology (IT) has evolved over the years to integrate innovative organizational administration techniques and provide for collaboration through workflow systems and organizational integration software, thus improving organizational efficiency. However, the conventional tools developed thus far fail to provide the level of efficiency demanded by organizations.

Another problem related to conventional technical solutions to organizational communications and management is a lack of feedback. Typically, the IT infrastructure adopted by organizations provides tools that deliver information to people. However, the conventional infrastructure does not offer tools that properly collect feedback and gather information from people about the information they receive or use. In other words, the conventional IT infrastructure sufficiently provides for the delivery of information to people but not the collection of information from people. There exists no set of IT tools that allows people to react to the information they receive and share useful information related to their reaction in a way that adds value to an organization.

The perception that people have about the information they receive is, in itself, valuable information that can be used in shaping the culture, efficiency and effectiveness of an organization. If employees are provided with timely feedback about their actions, they can react quickly to solve unperceived or unanticipated problems that result from their actions. This allows functional processes within an organization to rapidly adjust to new and changing conditions. Under conventional IT infrastructure, this sort of real-time feedback could only occur through informal and uncontrolled avenues.

In view of the short comings in information exchange and communication associated with conventional IT infrastructure and database systems, there remains a need for an improved system for providing employees with more effective communication tools that provide timely feedback about the information that permeates an organization.

SUMMARY OF THE INVENTION

Embodiments of the present invention provide a method, a computer program product, and a system for providing for feedback in organizational communications. In one aspect, the system provides members of an organization with more effective communication tools that provide timely feedback about the information in an organization.

In accordance with one aspect of an embodiment of the present invention, a system providing for data in organizational communications is provided. The system comprises an information processing apparatus, a communications mechanism, a database, and a mechanism for collecting data. The communications mechanism operates with the information processing apparatus for providing communications to a user of the information processing apparatus. The database operates in conjunction with the information processing apparatus and the communications mechanism. The database stores data. The mechanism for collecting the data operates in response to the communications related to the user by the communications mechanism. The mechanism for collecting data may be responsive to agents installed in existing applications for automatically collecting the data. Alternatively, the system further includes a user interface for receiving data entered by the user with the collection mechanism being responsive to the data received by the user interface.

In accordance with another aspect of an embodiment of the present invention, there is provided a method for providing for data relating to organizational communications. The method comprises a number of steps, including providing communications to users of an information processing system through the information processing system; utilizing the information processing system for collecting the data from the users on the communications the users received; saving the data in a data file in the information processing system; and allowing the users of the information processing system to use the information processing system to perform functions on the data in the data file. The functions performed on the data file may include displaying statistics to the users about the data in the data file, creating new data in the data file, deleting some of the data in the data file, providing the users with parameters and charts associated with the data in the data file, updating parameters associated with the data in the data file, and voting on the data in the data file. The data collected from the users of the information processing system may comprise feedback about the communications the users received. The functions performed on the data file by the users of the information processing system may be performed if the user requesting to perform one of the functions has authorization to perform the function. The method may further comprise the steps of allowing the users of the information processing system to organize the data in the data file into categories and allowing the users of the processing system to use the information processing system to perform functions on the categories of the data. The functions performed on the categories of the data may include displaying statistics to the users about the data in one of the categories, creating a new category, deleting one of the categories, updating a parameter relating to one of the categories, searching the data in the categories, displaying the results of searching the data in the categories to the users of the information processing system, browsing the data in the categories, and displaying the results of browsing the data in the categories. The data collected from the users of the information processing system may comprise feedback about the communications the users received. The functions performed on the categories of the data by the users of the information processing system may be performed if the user requesting to perform one of the functions has authorization to perform the function. The method may further comprise the step of allowing an administrator of the information processing system to give one of the users authority to set a control parameter, where the control parameter controls a rate of absorption of the data by the users of the information processing system. The method may further provide for tacit communications by allowing the users of the information processing system to provide the data anonymously. The method may also eliminate barriers in organizational communications by increasing the frequency and efficiency of communications within an organization, both horizontally and vertically across an organizational structure.

In accordance with another aspect of an embodiment of the present invention, there is provided a computer program product having a computer readable medium tangibly embodying computer executable instructions for providing for data relating to organizational communications. The computer program product comprises computer executable instructions for providing communications to users of an information processing system through the information processing system; computer executable instructions for utilizing the information processing system for collecting the data from the users on the communications the users received; computer executable instructions for saving the data in a data file in the information processing system; and computer executable instructions for allowing the users of the information processing system to use the information processing system to perform functions on the data in the data file. The functions performed on the data file include displaying statistics to the users about the data in the data file, creating new data in the data file, deleting some of the data in the data file, providing the users with parameters and charts associated with the data in the data file, updating parameters associated with the data in the data file, and voting on the data in the data file. The computer program product may further comprise computer executable instructions for allowing the users of the information processing system to organize the data in the data file into categories and computer executable instructions for allowing the users of the information processing system to use the information processing system to perform functions on the categories of the data if the user trying to perform one of the functions has authorization to perform the function. The functions performed on the categories of the data may include displaying statistics to the users about the data in one of the categories, creating a new category, deleting one of the categories, updating a parameter relating to one of the categories, searching the data in the categories, displaying the results of searching the data in the categories to the users of the information processing system, browsing the data in one of the categories, and displaying the results of browsing the data in one of the categories to the users of the information processing system. The computer program product may further comprise computer executable instructions for allowing an administrator of the information processing system to give one of the users authority to set a control parameter, the control parameter controlling a rate of absorption of the data by the users of the information processing system. The computer program product may eliminate barriers in organizational communications by increasing the frequency and efficiency of communications within an organization, both horizontally and vertically across an organizational structure.

Other aspects and features of the embodiments of the present invention will become apparent to those of ordinary skill in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 9 is a flow diagram illustrating a process in accordance with another aspect of the present invention.

Figure 1:
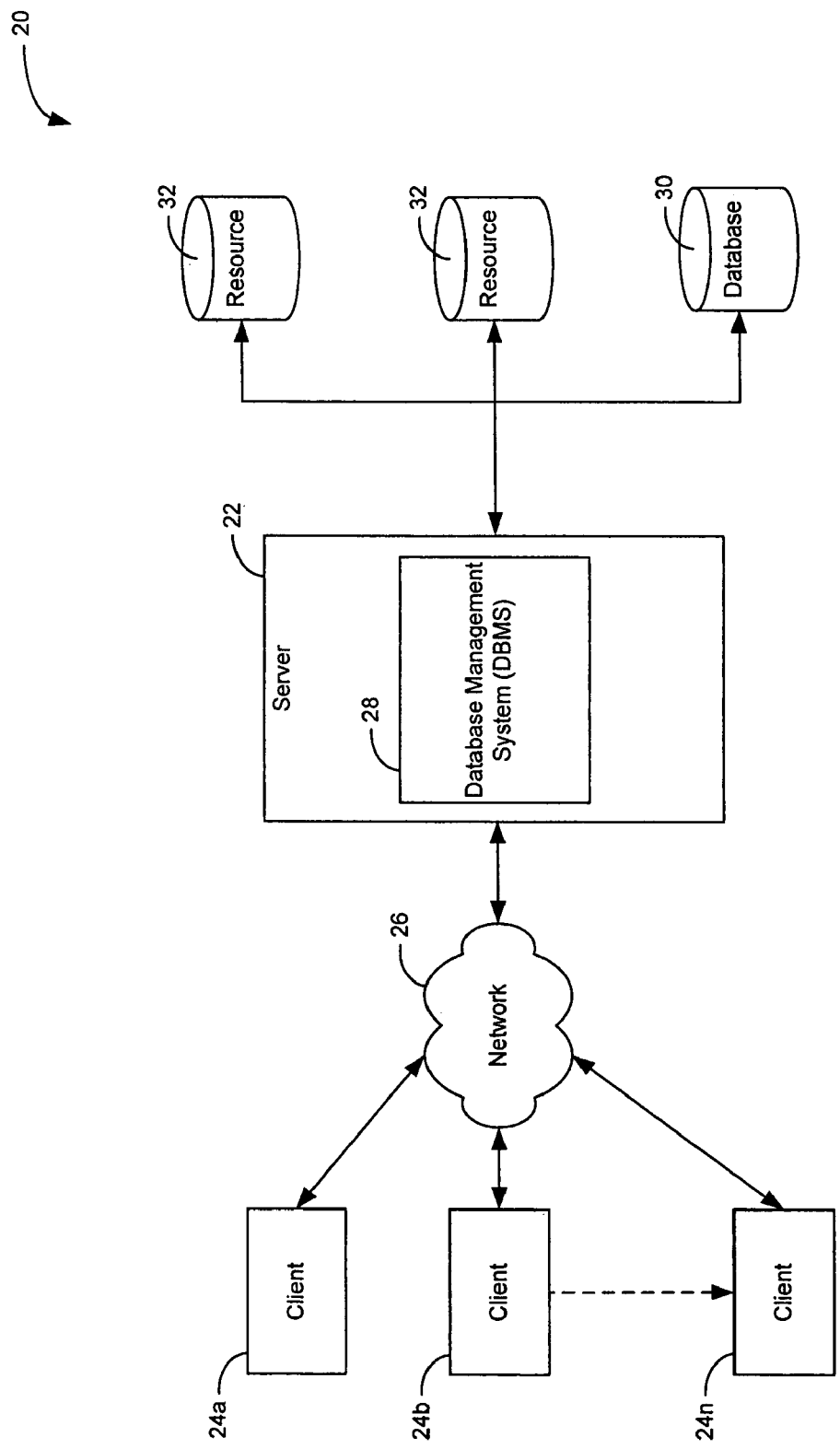
FIG. 1 is a schematic diagram of a computer system suitable for practicing the present invention.

Similar references are used in different figures to denote similar components.

DETAILED DESCRIPTION OF THE INVENTION

The following detailed description of the embodiments of the present invention does not limit the implementation of the embodiments to any particular computer programming language, hardware architecture, or database system. The computer program may be implemented in executable instructions in any computer programming language. One embodiment may be implemented in the C/C++ or J/J++ computer programming languages (or may be implemented in other computer programming languages in conjunction with C/C++ or J/J++). While particular examples are described within the context of a database system, any software or hardware solution may be used to implement the present invention. Any limitations presented would be a result of a particular type of operating system, computer programming language, or data processing system and would not be a limitation of the embodiments described herein.

Static information does not create value. In contrast, useful information that effectively flows through organizational processes that are designed to implement an appropriate organizational model may create tremendous value. As organizations use information to create value, operational efficiency generally increases. However, the reaction of people to the information they receive is equally important as the information itself.

Information flows across an organization and through a value chain in waves. According to the wave theory in physics, a wave system reaches its maximum state of efficiency when it achieves a resonant state. In this resonant state, weaker waves present in the system cumulatively add in an ordered structure to build a stronger, single wave that is the sum of the weaker waves. One aspect of the present invention provides a system that achieves the physical equivalent of resonance in the realm of organizational communications. These communications may be external business communications between different organizations, internal corporate or partnership communications, or any other type of communication. In this resonant state, the efficiency of the business model that the organization is implementing achieves new benchmarks.

Resonance is defined in physics as "the increase in amplitude of oscillation of an electric or mechanical system exposed to a periodic force whose frequency is equal to or very close to the natural undampened frequency of the system." There are several powerful examples of resonance in nature. Light waves that are combined to be spatially unidirectional and in phase with each other combine to create laser beams that are applied in unique applications involving medicine, scientific research, and communications. Musical instruments are designed to take advantage of sound resonance to improve the quality and intensity of the sound produced by the instruments. The basic condition for the phenomenon of resonance to occur is the movement of matter in waves. Generally, the result of resonance is an optimized energy flow. In a resonant state, the flow of energy continuously feeds itself, producing the highest levels of power and efficiency from a system.

One aspect of the present invention involves the application of the basic physical concept of resonance to the realm of organizational communications. Another aspect of the present invention contemplates a combination of hardware, software, and a method (e.g., processes) that allow for the efficient flow of information across an organization such that the informational dimension of the organization reaches a resonant state.

Resonance is a powerful physical phenomenon. However, resonant systems should also be carefully controlled. A classic example of a system that was designed without proper consideration for resonant behaviour (e.g., the natural frequency of the structure) is the Tacoma Narrows Bridge that collapsed in 1940, due to wind-induced oscillation. Another aspect of the present invention provides for control mechanisms to ensure that resonance is properly applied in the field of communications, such that information is not carelessly shared in inappropriate ways.

Referring to FIG. 1, a computer system 20 is shown. The computer system 20 generally comprises a server 22 and clients 24, indicated individually by 24a, 24b . . . 24n, interconnected by a network 26. The server 22 is modeled as a number of server components including a database server or database management system 28 (e.g., a relational database management system such as the DB2™ product from IBM™). The clients 24 may comprise single or multiprocessor computers, data processing systems, workstations, handheld portable information devices, or computer networks. The clients 24 may be similar or different. In one example, the network 26 comprises the Internet, the World Wide Web (WWW), a wireless link, a telecommunications system, a radio communications system, a computer network (e.g., a Local Area Network (LAN) or a Wide Area Network (WAN)), or combinations thereof.

The computer system 20 further includes a database 30 and resources 32 connected to the network 26. The resources 32 comprise storage media, additional databases, a set of eXtensible Markup Language (XML) documents, a directory service such as a Lightweight Directory Access Protocol (LDAP) server, and/or backend systems. In one example, data is stored across multiple databases. The interface connecting the server 22, the database 30, and the resources 32 comprises a LAN, the Internet, or a proprietary interface or combinations of the foregoing. The database 30 and the resources 32 are accessible by the server 22 and/or the clients 24. Any of the server 22, the clients 24, the database 30 and the resources 32 may be located remotely from one another or may share a single location. The configuration of the computer system 20, as shown in FIG. 1, is not intended to be a limitation of the present invention, as will be understood by those of ordinary skill in the art from a review of the following detailed description.

Figure 2:
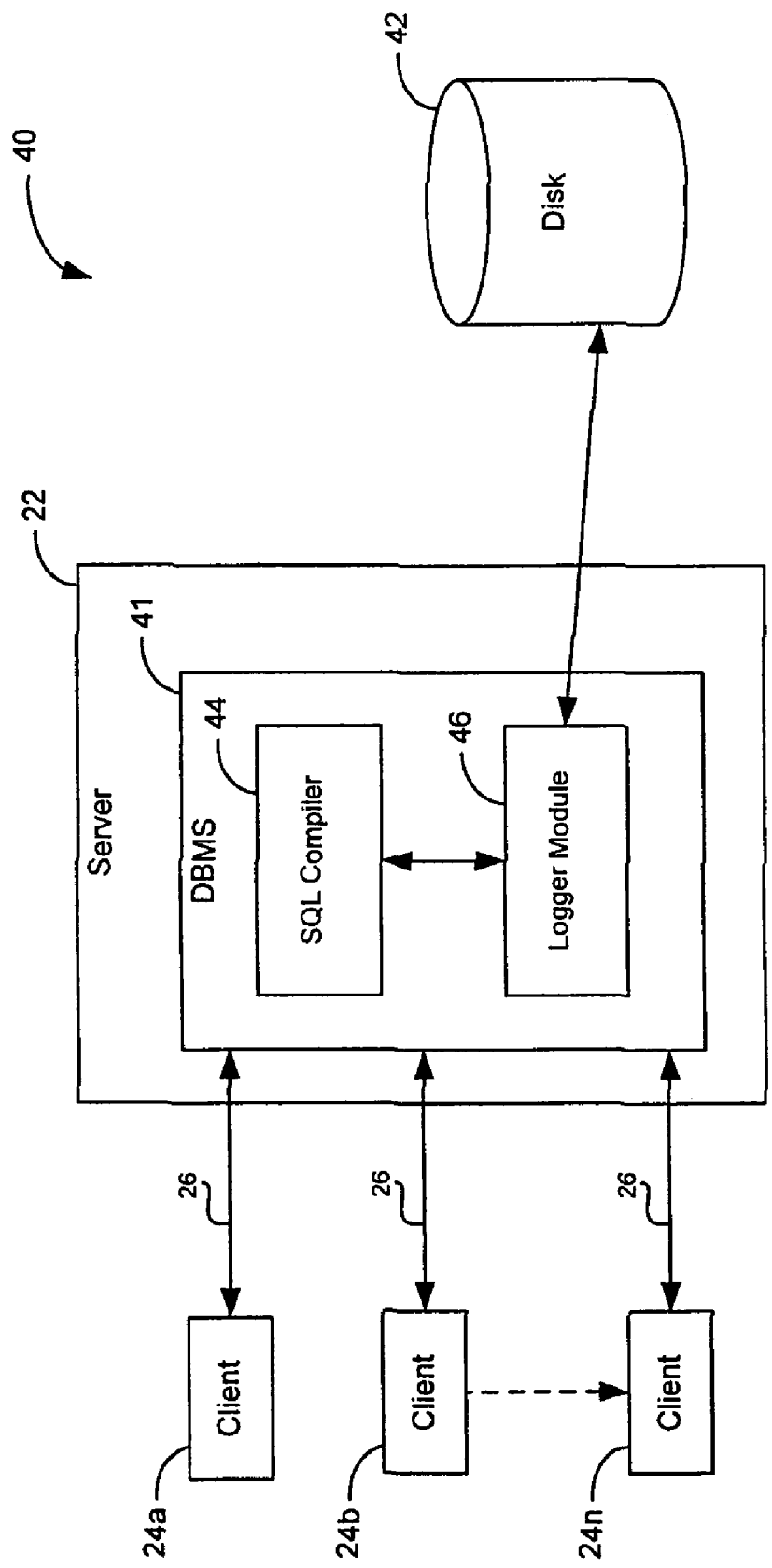
FIG. 2 is a schematic diagram of an exemplary database management system (DBMS) suitable for implementing the present invention.

Referring now to FIG. 2, a computer system 40 that could be used to implement the present invention is shown. The computer system 40 generally comprises a Database Management System (DBMS) 41 that resides on the server 22 and is generally connected via the network 26 to the clients 24 and to permanent or mass storage 42 (e.g., a hard or fixed disk, removable or floppy disk, optical disk, magneto-optical disk, and/or flash memory). In one example, the DBMS 41 comprises a Relational Database Management System (RDBMS) such as the DB2™ product from IBM™. The DBMS 41 includes an SQL compiler 44 that receives and processes user requests and a logger module 46 that maintains and manages a log comprising a plurality of log records for recording changes made to the database 30.

Figure 3:
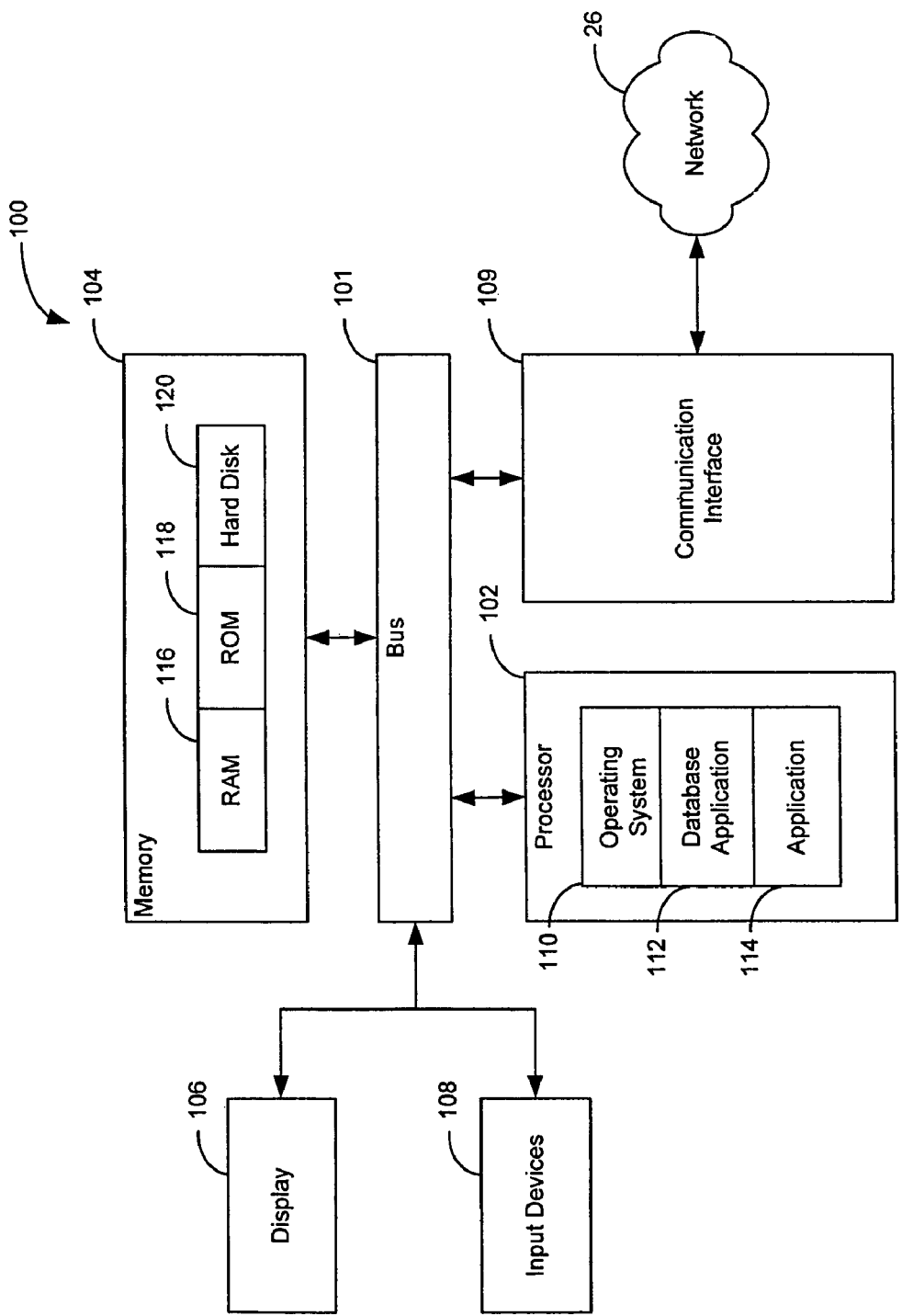
FIG. 3 is a block diagram of a data processing system for the computer system of FIG. 1 or FIG. 2.

Referring to FIG. 3, a data processing system 100 is shown of the computer system 20 or the computer system 40. The data processing system 100 generally comprises a bus 101, a processor 102, a memory 104, a display 106, user input devices 108, and a communication interface 109, which may all be coupled to the bus 101. In one example, the user input devices 108 are a keyboard or pointing device such as a mouse. The communication interface 109 provides an interface for communicating with the network 26. An operating system 110, a database application 112, or other application programs 114 run on the processor 102. The memory 104 includes Random Access Memory (RAM) 116, Read Only Memory (ROM) 118, and a hard disk 120. In one example, the data processing system 100 comprises either a client or a server.

By way of example only, and not limitation, the present invention will be described as implemented within the context of communications operating within an organization. In order to present an example embodiment of the present invention within the context of communications systems operating within an organization, it is beneficial to introduce the organizational structure and the value chain model.

Figure 4:
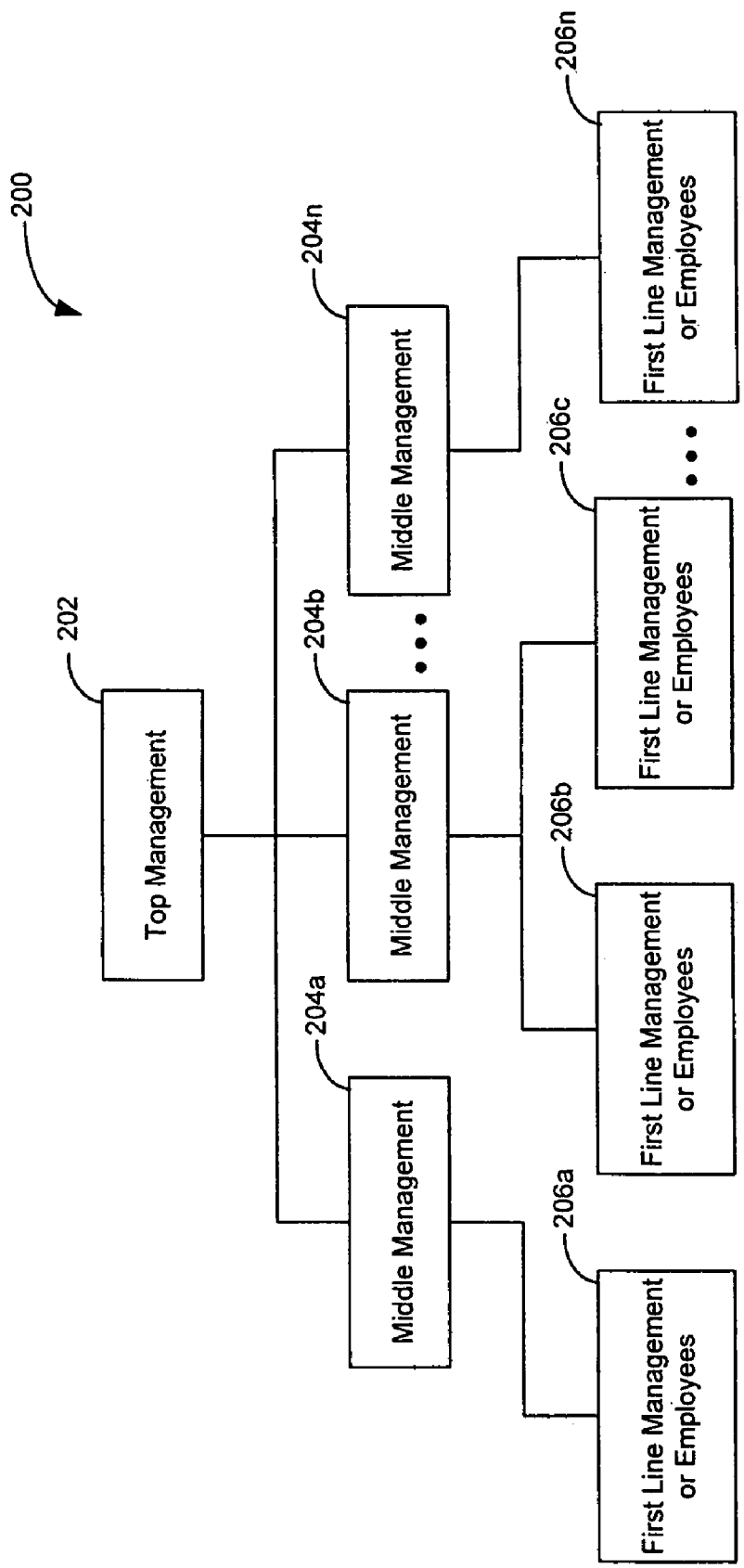
FIG. 4 is a block diagram illustrating an example of a typical organizational structure.

Referring to FIG. 4, a block diagram is shown illustrating an example of a typical organizational structure 200. The organizational structure 200 generally has a top level of management 202 (e.g., directors), a number of middle level management groups 204, indicated individually as 204a, 204b . . . 204n (e.g., often organized into functional departments or groups) and a number of low level (e.g., first line) managers and/or employees 206, indicated individually as 206a, 206b . . . 206n. Information typically flows vertically across organizational levels from the first line managers or employees 206 to the middle managers 204 and from the middle managers 204 to the top level of management 202 and vice-versa. Information may also flow horizontally (e.g., across a level through the rows between a-n) or diagonally (e.g., from the employees 206a to the middle managers 204n). Typically, the number of possible unique information flows in an organization is enormous. Additionally, communication occurs through countless media such as by phone, e-mail, personal meetings, broadcasts, office gossip or face-to-face conversations. Information flow is not only facilitated by people, but also occurs through software applications. The complex web of information flow within an organization also directly affects organizational culture. Some organizations intentionally erect barriers to the efficient flow of communication (e.g., the employees 206 may not be permitted to directly communicate with the directors 202). However, one constant can be discerned from the seemingly chaotic flow of information in an organization. From source to destination, no matter which communications medium is used, information flow can be modeled as occurring in waves.

Information generated at the top management levels 202 (e.g., the directors) usually flows through middle management 204 until it reaches the employees 206. In some cases, information from the directors 202 will not reach the employees 206, or is distorted by the time it reaches the employees 206. In contrast, some broadcasts from the directors 202 immediately reach the entire company. This inconsistency is often unintentional.

Figure 5:
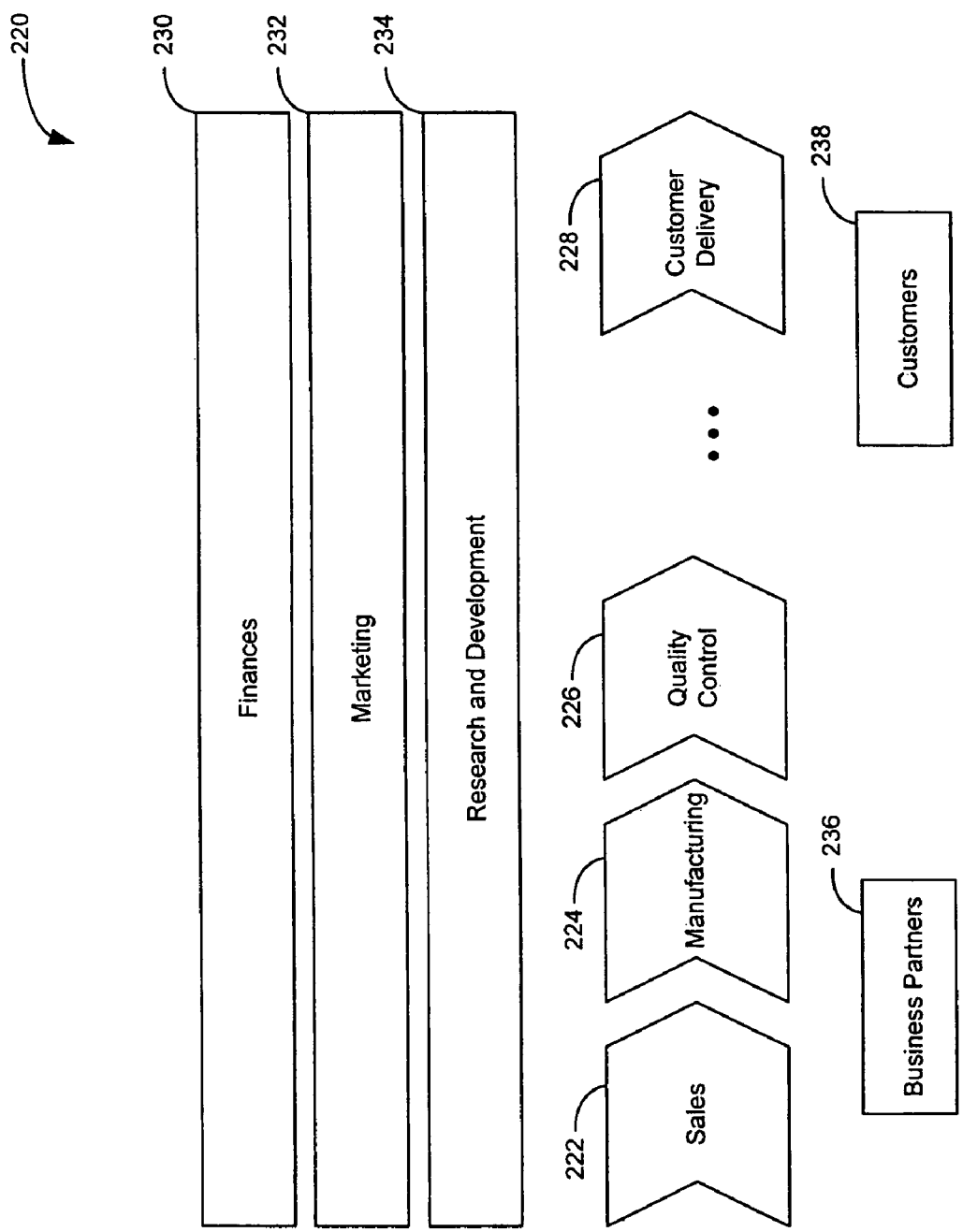
FIG. 5 is a block diagram illustrating an example of a value chain.

Referring to FIG. 5, an example of a value chain 220 is shown. To put communication and information flow into context with the specific activities through which organizations create a competitive advantage, it is useful to model the organization as a chain of value-creating activities. This approach is based on the work of Michael Porter who identified a set of interrelated generic activities common to a wide range of organizations. The example value chain shown in FIG. 5 generally comprises a set of core value creating activities such as a sales activity 222, a manufacturing activity 224, a quality control activity 226, and a customer delivery activity 228. The actual components of the value chain are dependent upon the particular organization under consideration. The specific value chain 220 is used for illustrative purposes only. Additionally, depending on the particular organization, some functions are integral to all activities in the value chain such as a financing activity 230, a marketing activity 232, and a research and development activity 234. The activities 230, 232, and 234 are generally referred to as support activities. Further, some external interactions are integral to the functioning of various aspects of the value chain such as interactions with business partners 236 and customers 238.

According to Newton's Third Law, for every action, there is an equal and opposite reaction. Seemingly, this also applies to communications, as information flows generate other information flows as a result of the beliefs of the participants in the information chain. People react and respond to the information they receive. For a physical system to be successfully designed, all such reactive forces must be accounted for and taken into consideration during the design stage. Similarly, many organizational failures can be attributed to the one way flow of information with little or no provision or consideration for feedback, how it should occur, and how it should be considered. One aspect of the present invention provides for the availability of a medium for information to propagate in both directions, thus enabling the effective control and management of feedback.

Resonance in communications occurs naturally in nature. The human body provides feedback mechanisms that provide for information to flow from cell to cell and through tissues and organs using electrochemical media. As such, organic entities may be viewed as a result of informational resonance in a live system. This represents a state of efficiency that is common in nature and is needed for a species to function in a way that allows the species to survive.

Effective use of resonance also involves removing barriers that block the free flow of information. Resonance can still occur in the face of barriers that block the free flow of information, but the resonant state may become unpredictable or difficult to control. Generally, for an organization to reach a resonant state of information exchange, efficient and effective communication across all organizational levels and through all elements of the value chain is needed. To achieve such a state, an organization might even need to include external participants such as suppliers, business partners, customers, or even competitors or the government.

Unobstructed feedback is a highly desirable element in achieving resonance in the exchange of information in an organization. Information flows should reach all branches of the organizational structure 200, propagate through the entire length of the value chain 220, and echo back to the initiator (e.g., the source of the information). This may necessitate changes to how information flows in a particular organization. Organizations typically have more communication channels dedicated to top-down information dissemination (e.g., from the top management 202 to the middle management 204 and from the middle management 204 to the employees or first line management 206) to accommodate typical daily functions such as communicating goals set by management or distributing product information from sales departments. Substantially less communication channels collect feedback from the employees 206, or from the customers 238 or the business partners 236. In many organizations, formal employee feedback is obtained only once or twice per year and customer satisfaction surveys are performed even less frequently. If an organization wishes to achieve a resonant state of information exchange, the organization generally needs to build more feedback channels and also develop its culture to promote feedback. In one aspect, the present invention provides the feedback channels needed to achieve unobstructed feedback in an organization.

One special type of information that flows across organizations is tacit communication. Often, in organizations that suffer from problems related to organizational culture, tacit communications account for a significant amount of organizational communication. Tacit communications may have direct consequences to corporate culture, team morale, customer expectations, or trust. If a resonant state in the exchange of information is to be achieved within an organization, tacit communications should also be accommodated. Since feedback that is unfavourable often occurs in the form of tacit communication, one way to accommodate tacit communication in a feedback system is to provide for anonymous feedback. One aspect of the present invention provides for tacit communications through anonymous feedback.

The more efficient the value chain 220 becomes, the higher level of productivity is obtained. In theory, the level of maximum efficiency that can be obtained from the value chain 220 is achieved when communications within the value chain 220 reach a resonant state: in the resonant state, all feasible cost reduction opportunities are exercised and all value creating business opportunities are realized. These opportunities can only be exercised within the value chain 220 when sufficient information about the opportunities is known. This all encompassing informational permeation generally occurs when the flow of information through the value chain 220 reaches a state of resonance such that there is no loss of information.

Communications across departments tend to be less frequent than communications within a department. Communications between separate organizations tend to be even less frequent due to a reduced number of communications channels. One aspect of the present invention stimulates communications across organizational departments and across separate organizations by creating more communications channels.

According to physical wave theory, the resonance of a wave is easily achieved when the absorption of the propagation medium is the smallest. If this rule is applied to the flow of information across an organizational structure 200 or through a value chain 220, the less barriers to the free flow of information that exist in an organization, the more powerful its resonant state will be. Secondly, according to the physical wave theory, resonant states are achieved when the frequency of the oscillating medium is the same as the frequency of the source of excitation. If this rule is applied to the flow of information across an organizational structure 200 or through a value chain 220, an organization that adopts a system that aims to achieve a resonant state can control the intensity of the resonance by controlling the main source of information in the organization (e.g., the top management 202). This allows for the top management 202 to control the level of communication within an organization.

Figure 6:
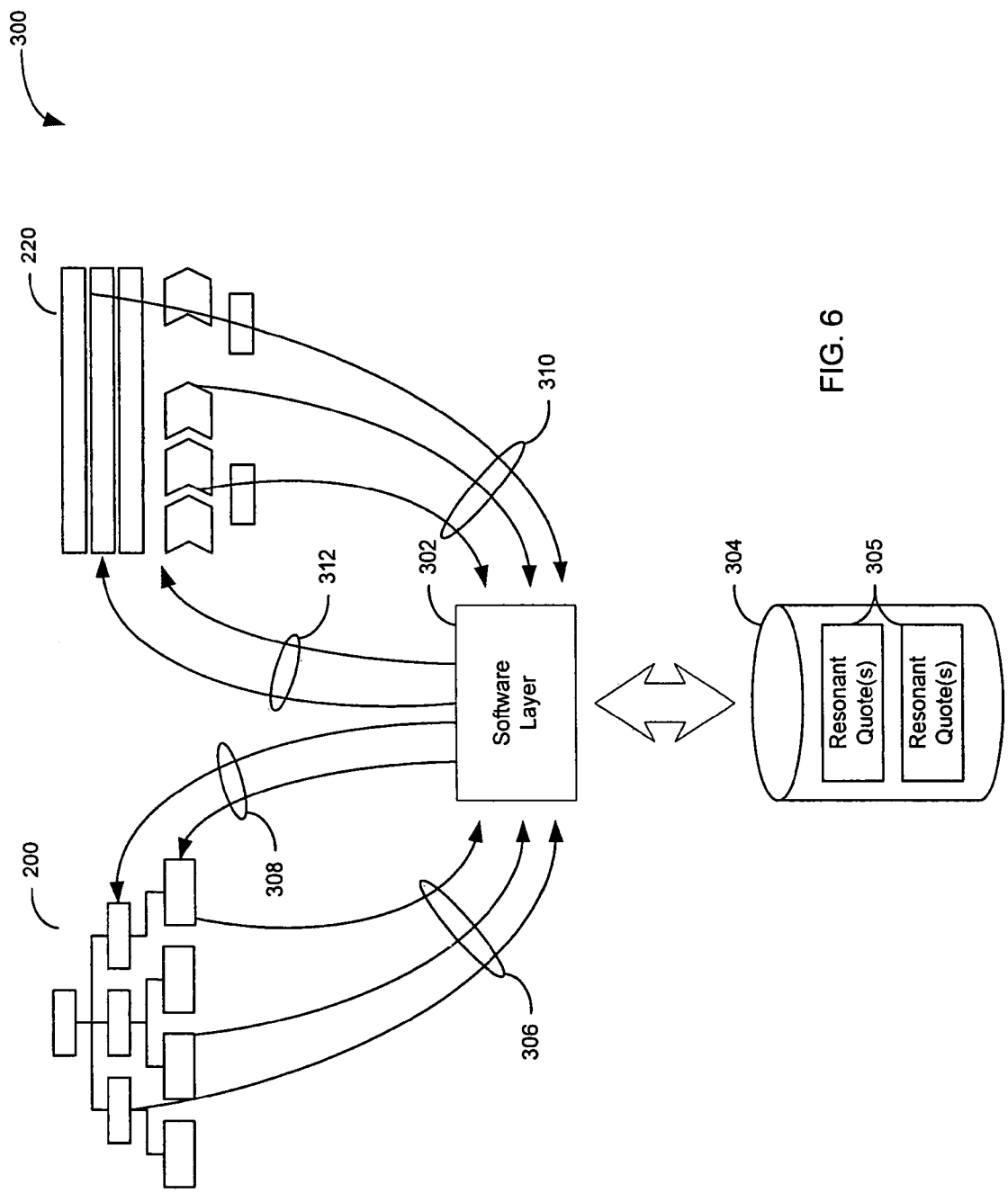
FIG. 6 is a block diagram illustrating an example of the context of the present invention.

Reference is made to FIG. 6, which shows a system 300 according to one aspect of the present invention. The system 300 comprises a software layer 302 and a database 304. The software layer 302 provides a wide number of functions as will be described in more detail below. The database 304 stores data provided to the database 304 by the software layer 302. In one example, the database 304 stores one or more resonant quotes 305. The database 304 is implemented using any database system known by those skilled in the art. Conventional computer infrastructure discussed with references to FIGS. 1, 2, and 3 facilitates the functions denoted by the arrows in FIG. 6 and the functions of the database 304 and/or the software layer 302. Specifically, users of the system 300 within the organizational structure 200 input data into the software layer 302 or vote on data existing within the software layer 302, as indicated by arrows 306. Users within the organizational structure 200 also query the resonant quotes 305 stored in the database 304 and provided by the software layer 302, as indicated by arrows 308. Users of the system 300 within the value chain 220 input resonant quotes 305 using the software layer 302 or vote on existing resonant quotes 305 within the database 304, as indicated by arrows 310. Users within the value chain 220 also query resonant quotes 305 stored within the database 304 and provided by the software layer 302, as indicated by arrows 312. It will be understood by those skilled in the art that there may be some overlap between the users within the organizational structure 200 and the value chain 220, as both the organizational structure 200 and the value chain 220 are models used to represent elements and/or people within an organization.

One aspect of the present invention may provide the central actor that allows an organization to achieve resonance with respect to the flow of information within the organization. Examples of the present invention provides a software and hardware solution that achieves a resonant state of information exchange within the organization by providing one or more of a multitude of features.

According to an aspect of the invention, barriers to the free flow of communication across the organizational structure 200 or through the value chain 220 are removed by: (a) centralizing all feedback and data on tacit communication that flows through the organization; (b) providing for a user interface that allows users to input, receive, or manage the flow of information; and (c) providing an Application Programming Interface (API) to all applications that process information in the organization. The API allows the users to influence the flow of information in the organization by dealing with the resonant quotes 305.

The present invention provides a feedback mechanism for the members of the organization. The feedback mechanism allows a member to obtain and provide feedback about the organization. The feedback mechanism includes a user interface and an API to update and query feedback in the feedback database 305. The feedback is stored in the database in the form of the resonant quotes 305. The feedback database allows members of the organization (e.g., both people and systems) to add, update and/or delete the resonant quotes 305, update the resonant quotes 305 with data (e.g., vote or provide additional feedback in relation to the resonant quotes 305 stored in the database 304) and/or query the data (e.g., read feedback). The system may be as live as the organization wishes or allows it to be by operating with any delay up to and including real-time operation. Users add new resonant quotes 305 to the feedback database 304 as new information becomes critical to the organization. Users can also delete the quotes 305 from the feedback database 304 as some of the quotes 305 become out-of-date. The API is provided to enable user applications to update and query feedback in the feedback database 304. In one example, E-mail and workflow systems are good sources of feedback. Users use the API within their E-mail or workflow applications to manipulate the data maintained by the feedback database 304. In one example, whenever a user replies to or forwards an E-mail, the user may choose to add an opinion about the email to the feedback database 304 at the same time.

According to another aspect, the present invention also provides an organizational tuning interface to allow organizational administrators (e.g., the top management 202) to change the pace of the organization. The organizational tuning interface provides for tuning of the resonant frequency of the system 300 (e.g., by controlling the pace of the organization or activity within the value chain). By setting up a business resonance framework (e.g., a set of resonant quotes 305 that match, for example, a balanced score card in a particular department), the organization is able to build a basic framework to enable for resonance in the flow of information. The organizational tuning interface also sets an absorption parameter in order to control the sharpness of the resonant state. High level management provides a power input (e.g., a weighting value for the exciting source provided by the present invention). In one example, the frequency of the resonant state to be achieved by the organization is the frequency of the input of information into the system. Therefore, the top management 202 can establish and adapt the pace of the organization depending on the frequency of updates of the resonant quotes 305 in the business resonance framework.

The software layer 302 and the database 304 store and/or maintain data, including:

1. An absorption parameter: The absorption parameter defines a sharpness value of the resonant condition (e.g., how well defined the resonant state is that occurs within the organization).
2. Resonant quotes: In one example of the present invention, the resonant quotes 305 form the core informational component of the system 300. The resonant quotes 305 comprise data created by a user in the organization who explores the feedback stored in the database 304. Examples of the resonant quotes 305 include: balanced score cards, market research related to customer satisfaction about products, or a measure of trust (e.g., a user who is interested in evaluating the level of trust he has earned from coworkers). There is no limit on the number or types of the resonant quotes 305 an organization chooses to implement within the system 300. A complex organization may have several thousand resonant quotes 305. The resonant quotes 305 may be related to any aspect of an organization, including departments or people. The resonant quotes 305 include numeric answers to qualitative questions. In one example, the resonant quotes 305 include questions such as "How do my partners see me?", "How good is my product?", or "How effective is a particular business process?". The resonant quotes 305 are cumulatively stored in the database 304 to provide for the possibility of offering historic charts and analysis on past trends. A particular resonant quote 305 may have many aspects to it. In one example, the resonant quote 305 is described (e.g., as relating to the "level of satisfaction about a product XYZ"). The resonant quotes 305 includes a value (e.g., 80). The resonant quotes 305 have a volume of voters (e.g., 100 voters). The resonant quotes 305 are be stored using a conventional directory format indicating their location in the database 304 (e.g., X:/CompanyX/Marketing/ProductXYZ/Satisfaction). The resonant quotes 305 have a range (e.g., a minimum value and meaning such as "0=unsatisfied" and a maximum value and meaning such as "100=very satisfied").

3. Security data: Security data includes authorization information about who may query which resonant quote 305 in the database 304. While most of the resonant quotes 305 should be open to all members of the organization, there may be some sensitive resonant quotes 305 that may contain confidential or personal information. In one example, those sensitive quotes 305 are anonymously available for voting to all users of the system 300 but are queried only by select uses having appropriate authorization.

The software layer 302 includes the following tasks:

1. User interface logic: A user interface is provided for users to create, delete, query and/or vote on the resonant quotes 305. In one example, the user interface presents the resonant quotes 305 or volumes of votes in the form of charts so that the members of the organization can follow any trends in the resonant quotes 305. The user interface allows the users to create, delete, query, browse, update and/or manage categories of the resonant quotes 305. The user interface allows users to organize the resonant quotes 305 into the categories.
2. Security control: User authorization is controlled (e.g., which of the resonant quotes 305 may be accessed by which users or groups of users). Users can have different levels of access or be assigned various privileges including read, write, and/or update privileges.
3. Statistics: Statistical information is collected (e.g., what are the most popular of the resonant quotes 305, the most popular categories of the resonant quotes 305, or the resonant quotes 305 that are voted on the most).
4. Systems integration: APIs are provided for corporate applications to interact with the software layer 302 and manipulate the resonant quotes 305. The corporate applications include workflow systems, E-mail systems, Enterprise Resource Planning (ERP) systems, or Customer Relationship Management (CRM) systems. This allows automatic updates to the resonant quotes 305 based on inputs from the organizational system.
5. Over-influence prevention: Intelligence is provided that prevents members of the organization from voting multiple times on one of the resonant quotes 305, thus misleading the results.

The software layer 302 provides the user interface, as previously mentioned, that enables the users of the system 300 to perform the following actions:

1. The users are able to manage the resonant quotes 305 by creating, deleting, querying, updating, and/or managing the quotes 305. Additionally, the users are able to vote on or delegate work related to the resonant quotes 305.
2. The users are able to deal with categories of the resonant quotes 305. Specifically, the users are able to create, delete, query, browse, update, and/or manage the resonant quotes 305 or delegate work related to the resonant quotes 305.
3. The users are able to access statistics related to the resonant quotes 305.
4. The users are able to manage security related to the resonant quotes 305. The users are able to perform authorization operations relating to the resonant quotes 305, including restricting some users and/or groups of users from accessing some of the resonant quotes 305 and/or providing a level of access to each user or group of users.
5. The users are able to set up an absorption parameter related to the system 300.

The system 300 provides APIs that allow other software applications or systems to interact with the system 300 to perform some of the operations that are directly available to users through the user interface of the system 300. This allows commonly used software applications or automatic agents within the organization to interact with the software layer 302 and perform functions including:

1. Creating, deleting, querying, updating, managing, and/or voting on the resonant quotes 305 and/or delegating work with respect to the resonant quotes 305.
2. Dealing with categories of the resonant quotes 305 by creating, deleting, querying, browsing, updating, and/or managing the categories and/or delegating work with respect to the categories.
3. Managing security by performing operations to manage authorization to access the resonant quotes 305 by restricting users and/or groups of users from accessing some of the resonant quotes 305 and/or providing the level of access each user or group of users has over the resonant quotes 305.

Other software applications or systems that interact with the system 300 include E-mail, workflow, order entry, CRM, ERP, and/or supply chain management applications or systems. Information is collected from the other applications or systems through agents that perform this task. The combination of the user interface and the systems interface provides for control of the system 300.

The system 300 may include security functions related to access authorization to the resonant quotes 305 or categories of the resonant quotes 305. The system 300 uses a directory server to provide authentication functions, user management functions and/or user group management functions. The system 300 maintains an authorization database stored in the database 304 or elsewhere that is updated with information about which of the resonant quotes 305 can be accessed by users or groups of users and the level of access granted to each user or group of users. The access levels assigned to each user or group of users allows the user or group of users to perform any one of the following functions:

1. Create a new resonant quote 305;
2. Delete one or more of the resonant quotes 305;
3. Query the contents of the resonant quotes 305;
4. Update the contents of one or more of the resonant quotes 305;
5. Manage configuration data related to the resonant quotes 305;
6. Vote on one or more of the resonant quotes 305; and/or
7. Delegate grants of authorization related to one or more of the resonant quotes 305 to users or groups of users.

Access levels to the resonant quotes 305 include one or more of the following functions:
1. Create one or more new categories;
2. Delete one or more categories of the resonant quotes 305;
3. Query the contents of a category to ascertain the resonant quotes 305 that fall into a particular category;
4. Browse through sub-categories of the resonant quotes 305;
5. Update the contents of a category of the resonant quotes 305;
6. Manage configuration data related to a category of the resonant quotes 305; and/or
7. Delegate grants of authorization related to a category of the resonant quotes 305 to other users or groups of users.

Information flows naturally across an organizational structure 200 or through a value chain 220 as a result of the dynamics of the processes of the organization. The transparent communication of information to all levels of the organizational structure 200 or all stages of the value chain 220 is performed by the system 300. The system 300 collects this information using two approaches:
1. The Active Approach: The system 300 actively intercepts information (e.g., votes to the resonant quotes 305) through resonant agents installed in existing organizational systems or applications such as E-mail, workflow, order entry, CRM, ERP, and/or supply chain management applications or systems.
2. The Passive Approach: The system 300 is fed with votes to the resonant quotes 305 (e.g., feedback) by users that are members of the organization through the user interface of the software layer 302.

Implementing a passive feedback collection strategy with the system 300 may necessitate instituting changes in the way people work within an organization. As users complete tasks, they must provide feedback by voting on the resonant quotes 305 in the system 300. The organization may have to promote the benefits of reading the resonant quotes 305 or creating personal resonant quotes 305 to motivate users to use the system. Generally, anonymous voting results in a more effective system.

The present invention may promote change in organizational processes to create the necessary conditions to achieve a resonant state of information exchange and make the organization more transparent. The people that work in a resonant environment may find that it promotes the exercise of honesty and self-development, both personal and professional.

Figure 7:
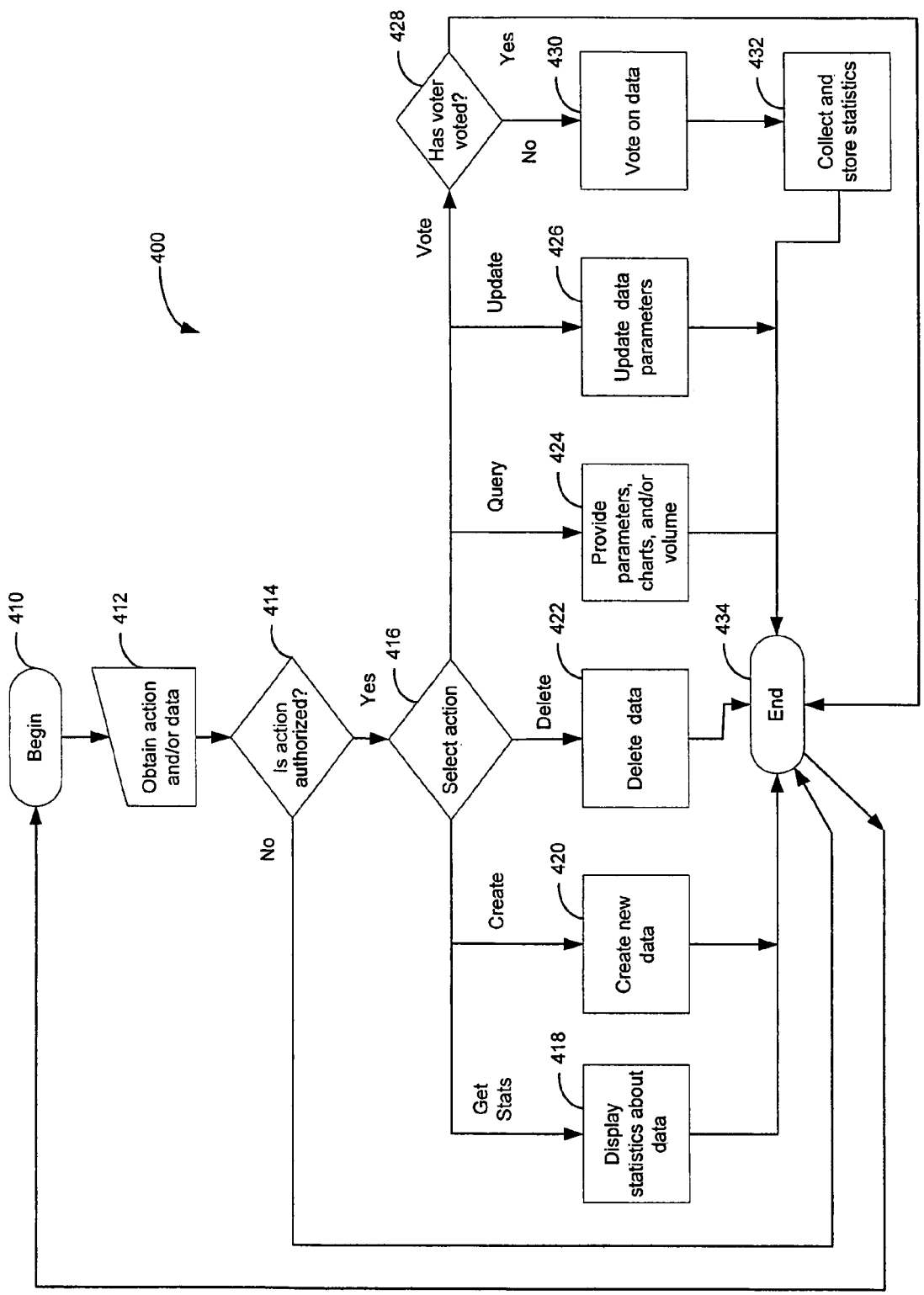
FIG. 7 is a flow diagram illustrating a process in accordance with one aspect of the present invention.

Referring to FIG. 7, a flow diagram is shown illustrating a process 400 in accordance with another aspect of the present invention. The process 400 generally comprises a beginning stage 410, an input stage 412, a decision stage 414, a decision stage 416, an action stage 418, an action stage 420, an action stage 422, an action stage 424, an action stage 426, a decision stage 428, an action stage 430, an action stage 432, and an end stage 434. At the beginning stage 410, a user decides to make use of the system 300, proceeding to the stage 412 where the user uses the interface of the software layer 302 to request to perform an action with respect to information in the database 304. From here, the process 400 proceeds to the stage 414 to determine if the action that the user is requesting to perform is authorized. If the action that the user is requesting to perform is authorized, the process proceeds to the stage 416. Otherwise, the process 400 terminates at the end stage 434. At the stage 416, the process 400 determines the appropriate action to take based on the request of the user and proceeds to the appropriate stage to execute the appropriate action. At the stage 418, the process 400 presents the user with statistics related to one or more of the resonant quotes 305 in the database 304. At the stage 420, the process 400 allows the user to create new data in the database 304 (e.g., a new resonant quote 305). At the stage 422, the process 400 allows the user to delete data in the database 304 (e.g., delete a resonant quote 305). At the stage 424, the process 400 provides the user with parameters, charts, volume, and/or other information with respect to data in the database 304 (e.g., one or more of the resonant quotes 305). At the stage 426, the process 400 allows the user to update one or more parameters with respect to data in the database 304 (e.g., update parameters with respect to one or more of the resonant quotes 305). If the user elected to vote on one or more of the resonant quotes 305 in the database 304, after the stage 416, the process 400 proceeds to the stage 428 to determine if the user had already voted on one of the one or more resonant quotes 305 that the user has requested to vote on. If the user had already voted, the process 400 proceeds to the end stage 434. If the user had not already voted on any of the one or more resonant quotes 305 that the user requested to vote on, the process 400 proceeds to the stage 430 where the user votes on one or more of the resonant quotes 305. After the stage 430, the process 400 proceeds to the stage 432 where the process 400 collects and stores statistics related to the votes performed by the user in the database 304. The stages 418, 420, 422, 424, 426, and 432 proceed to the end stage 434. The process 400 then begins again or repeats.

Figure 8:
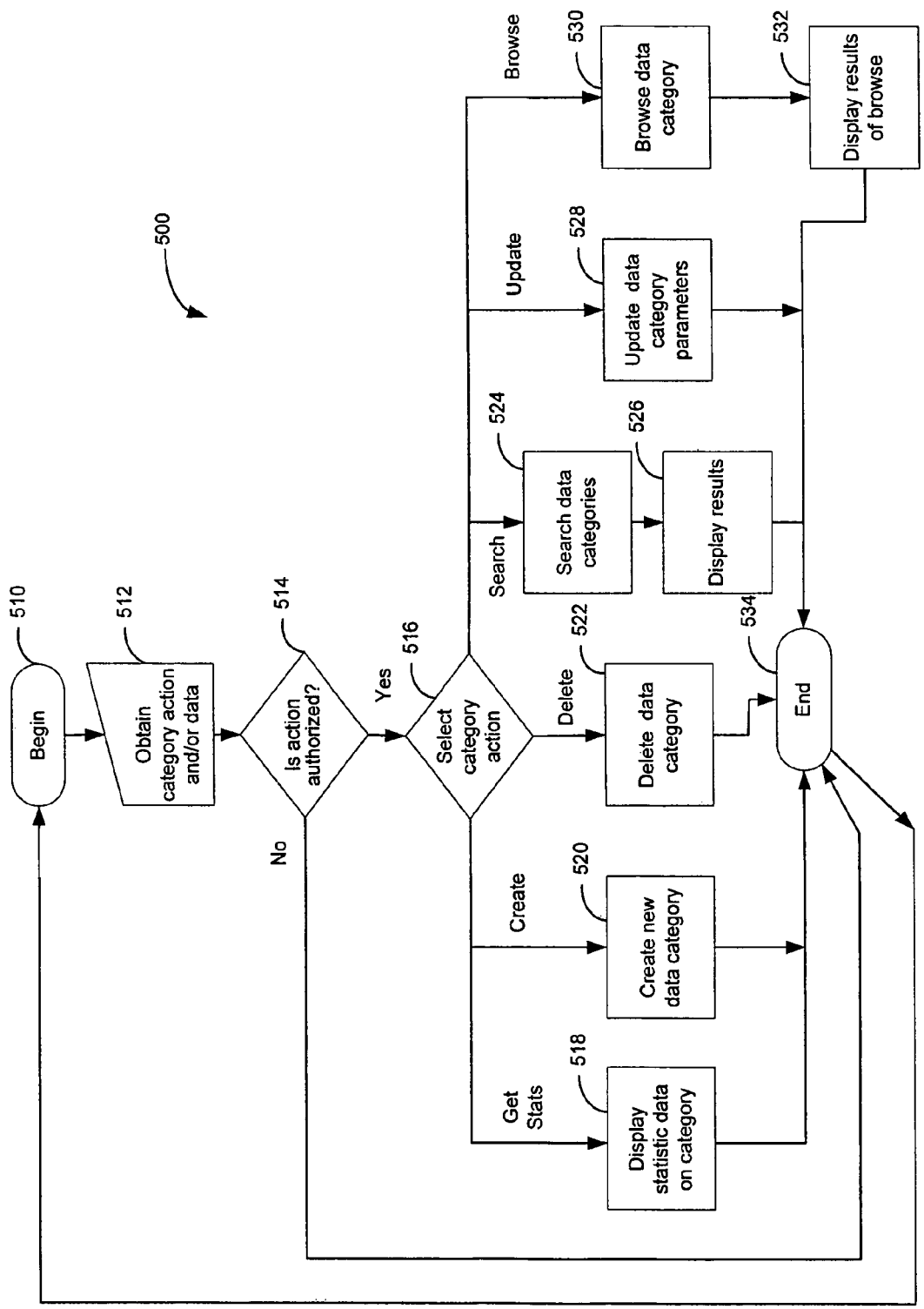
FIG. 8 is a flow diagram illustrating a process in accordance with another aspect of the present invention.

Referring to FIG. 8, a flow diagram is shown illustrating a process 500 in accordance with another aspect of the present invention. The process 500 may be similar to the process 400, except that the process 500 operates on categories of the resonant quotes 305. The process 500 generally comprises a beginning stage 510, an input stage 512, a decision stage 514, a decision stage 516, an action stage 518, an action stage 520, an action stage 522, an action stage 524, an action stage 526, an action stage 528, an action stage 530, an action stage 532, and an end stage 534. At the beginning stage 510, a user decides to make use of the system 300, proceeding to the stage 512 where the user uses the interface of the software layer 302 to request to perform an action with respect to categories of the information stored in the database 304. From here, the process 500 proceeds to the stage 514 to determine if the action that the user is requesting to perform is authorized. If the action that the user is requesting to perform is authorized, the process proceeds to the stage 516. Otherwise, the process 500 terminates at the end stage 534. At the stage 516, the process 500 determines the appropriate action to take based on the request of the user and proceeds to the appropriate stage to execute the appropriate action. At the stage 518, the process 500 presents the user with statistics related to one or more categories of the resonant quotes 305 in the database 304. At the stage 520, the process 500 allows the user to create new categories in the database 304 (e.g., a new category of the resonant quotes 305). The new category created by the user either comprises preexisting resonant quotes 305 or new resonant quotes 305 to be entered by users of the system 300 at a future time. At the stage 522, the process 500 allows a user to delete a category in the database 304 (e.g., delete a category of the resonant quotes 305). At the stage 524, the process 500 provides the user with the ability to search through categories of data in the database 304 (e.g., search through categories of the resonant quotes 305). After the stage 524, the process 500 proceeds to the stage 526 where the process 500 displays results of the search performed at the stage 524. At the stage 528, the process 500 allows the user to update one or more parameters with respect to categories of the data in the database 304 (e.g., update parameters with respect to one or more categories of the resonant quotes 305). At the stage 530, the process 500 allows the user to browse through categories of the data stored in the database 304 (e.g., categories of the resonant quotes 305). After the stage 530, the process proceeds to the stage 532 where the process 500 displays the results of the browse performed at the stage 530. The stages 518, 520, 522, 526, 528, and 532 proceed to the end stage 534. The process 500 then begins again or repeats.

Referring to FIG. 9, a flow diagram is shown illustrating a process 600 in accordance with another aspect of the present invention. The process 600 allows a member of upper management at a firm (e.g., a member of the top management 202) to set one or more control data parameters with respect to the system 300. The process 600 generally comprises a beginning stage 610, an input stage 612, an action stage 614, and an end stage 616. At the beginning stage 610, the process 600 waits for an authorized user to want to change one or more of the parameters controlling the operation of the system 300. When a user wishes to change a parameter, the process 600 proceeds to the stage 612 where the user inputs control data relating to the operating of the system 300. The process 600 then proceeds to the stage 614 where the one or more control data parameters set by the user at the stage 612 are stored in the system (e.g., in the database 304 by the software layer 302). Finally, the process 600 proceeds to the end stage 616 where the process 600 begins again. In one example, the control data parameter set by the process 600 comprises an absorption parameter defining a sharpness value of the resonant condition (e.g., how well defined the resonant state is that occurs within the organization).

The present invention may be embodied in other specific forms without departing from the spirit or characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for providing for data in organizational communications, the system comprising:
    an information processing apparatus including a computer system;
    a communications mechanism operating with the information processing apparatus for providing communications to a user of the information processing apparatus, wherein an administrator of the information processing apparatus sets a control parameter for the user, the control parameter indicating a rate of absorption of the communications by the user of the information processing system;
    a database operating in conjunction with the information processing apparatus and the communications mechanism, the database for storing data; and
    a mechanism for collecting the data from the user in response to the communications related to the user by the communications mechanism, wherein the data comprises feedback about communications received by the user via the communications mechanism, and the data is stored as a resonant quote that includes a value, a volume of voters that represents an amount of feedback, and security data that includes authorization information regarding querying access to the resonant quote, the mechanism further allowing the user of the information processing apparatus to organize the data into categories, and allowing the users of the information processing apparatus to use the information processing system to perform functions on the data in the data file, wherein the functions performed on the data are selected from the group consisting of displaying statistics to the users about the data, creating new data, deleting some of the data, providing the users with parameters and charts associated with the data, updating parameters associated with the data, and voting on the data.

2. The system as claimed in claim 1, wherein the mechanism for collecting data is responsive to agents installed in existing applications for automatically collecting the data.

3. The system as claimed in claim 1, further including a user interface for receiving data entered by the user, the collection mechanism being responsive to the data received by the user interface.

4. A method for providing for data relating to organizational communications, the method comprising:
    providing communications to users of an information processing system through the information processing system;
    allowing an administrator of the information processing system to give one of the users authority to set a control parameter, the control parameter controlling a rate of absorption of the data by the users of the information processing system;
    utilizing a computer system of the information processing system for collecting data from the users on the communications the users received, wherein the data collected from the users of the information processing system comprises feedback about the communications the users received;
    saving the data in a data file in the information processing system, wherein the data is stored as a resonant quote that includes a value, a volume of voters that represents an amount of feedback, and security data that includes authorization information regarding querying access to the resonant quote;
    allowing the user of the information processing apparatus to organize the data into categories; and
    allowing the users of the information processing system to use the information processing system to perform functions on the data in the data file, wherein the functions performed on the data are selected from the group consisting of displaying statistics to the users about the data, creating new data, deleting some of the data, providing the users with parameters and charts associated with the data, updating parameters associated with the data, and voting on the data.

5. The method as claimed in claim 4, wherein the functions performed on the data file by the users of the information processing system are performed if the user requesting to perform one of the functions has authorization to perform the function.

6. The method as claimed in claim 4, wherein the functions performed on the categories of the data are further selected from the group consisting of displaying statistics to the users about the data in one of the categories, creating a new category, deleting one of the categories, updating a parameter relating to one of the categories, searching the data in the categories, displaying results of searching the data in the categories to the users of the information processing system, browsing the data in the categories, and displaying results of browsing the data in the categories.

7. The method as claimed in claim 6, wherein the data collected from the users of the information processing system comprises feedback about the communications the users received.

8. The method as claimed in claim 4, wherein the functions performed on the categories of the data by the users of the information processing system are performed if the user requesting to perform one of the functions has authorization to perform the function.

9. The method as claimed in claim 4, wherein the method provides for tacit communications by allowing the users of the information processing system to provide the data anonymously.

10. A computer program product having a computer readable storage medium tangibly embodying computer executable instructions for providing for data relating to organizational communications, the computer program product comprising:
 computer executable instructions for providing communications to users of an information processing system through the information processing system;
 computer executable instructions for allowing an administrator of the information processing system to give one of the users authority to set a control parameter, the control parameter controlling a rate of absorption of the data by the users of the information processing system;
 computer executable instructions for utilizing the information processing system for collecting data from the users on the communications the users received, wherein the data collected from the users of the information processing system comprises feedback about the communications the users received;
 computer executable instructions for saving the data in a data file in the information processing system, wherein the data is stored as a resonant quote that includes a value, a volume of voters that represents an amount of feedback, and security data that includes authorization information regarding querying access to the resonant quote;
 computer executable instructions for allowing the user of the information processing apparatus to organize the data into categories; and
 computer executable instructions for allowing the users of the information processing system to use the information processing system to perform functions on the data in the data file, wherein the functions performed on the data are selected from the group consisting of displaying statistics to the users about the data, creating new data, deleting some of the data, providing the users with parameters and charts associated with the data, updating parameters associated with the data, and voting on the data.

11. The computer program product as claimed in claim 10, wherein the functions performed on the categories of the data are further selected from the group consisting of displaying statistics to the users about the data in one of the categories, creating a new category, deleting one of the categories, updating a parameter relating to one of the categories, searching the data in the categories, displaying results of searching the data in the categories to the users of the information processing system, browsing the data in one of the categories, and displaying results of browsing the data in one of the categories to the users of the information processing system.

\* \* \* \* \*